(No Model.)

E. H. DE LANY.
STEAM ACTUATED VALVE.

No. 604,489. Patented May 24, 1898.

WITNESSES

INVENTOR
Edwin H. DeLany
By W. W. Dudley & Co.
his Attorneys.

United States Patent Office.

EDWIN H. DE LANY, OF CLEVELAND, TENNESSEE.

STEAM-ACTUATED VALVE.

SPECIFICATION forming part of Letters Patent No. 604,489, dated May 24, 1898.

Application filed August 2, 1897. Serial No. 646,798. (No model.)

*To all whom it may concern:*

Be it known that I, EDWIN H. DE LANY, of Cleveland, in the county of Bradley and State of Tennessee, have invented a new and useful Steam-Actuated Valve for a Direct-Acting Pump; and I do hereby declare that the following is a full, true, clear, and exact description of the same.

A cylindrical valve similar in form to an ordinary hollow piston-valve is used for the steam-distributing valve and performs its function by moving back and forth under steam-pressure (in the direction of its axis) in the cylindrical bore of the valve-chest. The distributing-valve is bored out concentric with its cylindrical surface. In this bore is fitted a small cylindrical valve which is attached to the valve-stem. This auxiliary valve receives its motion from an arm carried by the piston-rod, (not shown,) said arm striking first one and then the other of two adjustable tappets on the valve-stem. The motion of the auxiliary valve relative to the main valve opens the space at one end of the main valve to steam and that at the other to exhaust, causing both valves to move together under the force of the steam.

Figure 1:
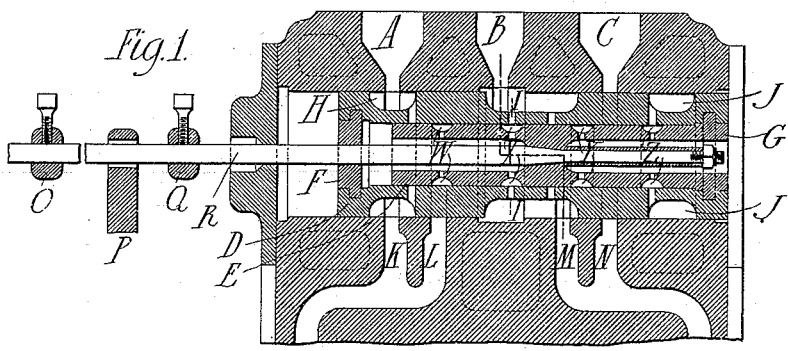
Figure 2:
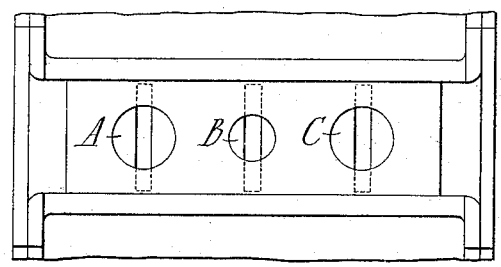
Figure 3:
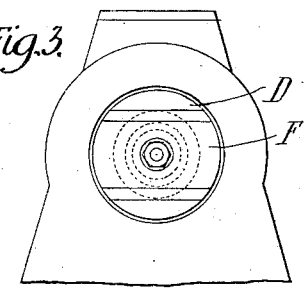
Figure 4:
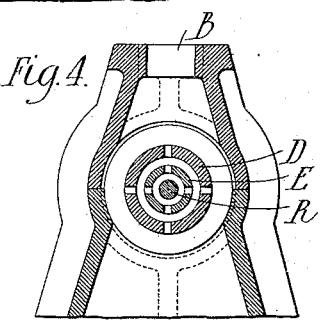
Figures 5, 6:
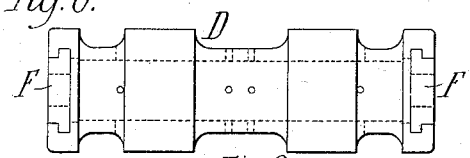
Figures 8, 9, 11, 12:
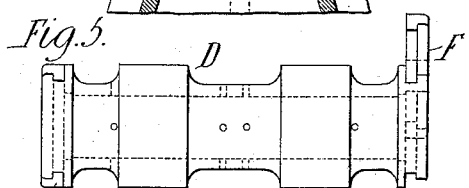
Figures 7, 10:
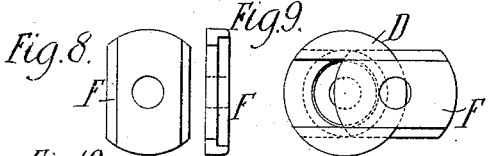

In the accompanying drawings, which form a part of this specification, Figure 1 is a longitudinal section of valves and valve-chest; Fig. 2, a plan of valve-chest, (valve not shown;) Fig. 3, an end view of valve and chest, (bonnet removed;) Fig. 4, a section of valve-chest through line B M and section of valves through line I I; Figs. 5, 6, and 7, three views of main valve with one stop-piece in place and one partly removed; Figs. 8, 9, and 10, three views of stop-piece, (F and G in Fig. 1;) Figs. 11 and 12, two views of auxiliary valve.

The working of the valve may be understood by referring to Fig. 1.

A and C are exhaust-ports from valve-chest to condenser.

B is steam-supply.

L and M are steam-ports from valve-chest to cylinder.

K and N are exhaust-ports from cylinder to valve-chest.

H, I, and J are annular grooves cut in the main valve, from which holes are bored radially to the inside bore of the valve. $w$, $x$, $y$, and $z$ are similar grooves (having similar holes) cut in the auxiliary valve.

F and G are stop-pieces to limit the travel of auxiliary in main valve. They are slipped into place from the side while main valve is out of chest and are held in place when valve is in position by the curved ends taking against curved surface of valve-chest bore.

In position shown steam is passing from B around through I and through M into right end of cylinder, forcing piston to the left. The left end of the cylinder is exhausting through K, around H, into A. At the same time steam has passed through holes from I into X and from X through holes into left-hand inside space of auxiliary valve and into space at left end of valves, holding both valves to extreme right of their travel. As the piston comes near the end of its stroke P (which is rigidly attached to the piston-rod) strikes the tappet O, pulling the auxiliary valve E against the stop-piece F. This closes $x$ to steam from I and closes $z$ from J, at the same time opening $y$ to holes from I and $w$ to holes from H, the effect being to give steam to right end of valves and to exhaust from left end, forcing the two valves together to the extreme left of the travel. As A is closed from H the remaining steam at the left end will cushion the main valve as it strikes the head. The holes from the grooves $w$, $x$, $y$, and $z$ to the inside of the auxiliary valve may be made any size and number as may be required. In the new position of the main valve K and M are closed, L is open to steam through I, and N to exhaust through J. The piston is forced to the right until P strikes Q, and a similar operation to the above places valves in position, as shown in Fig. 1.

What I claim as my invention is—

The combination with the valve-chest provided with supply and exhaust ports substantially as described, of a main valve consisting of a hollow cylindrical body having exterior annular grooves and passages therefrom to the interior, and an auxiliary valve consisting of a hollow cylindrical body movable within the main valve and provided with exterior annular grooves and openings leading therefrom to its interior, said valves being open-ended, and means interposed between a movable part of the engine and the auxiliary valve for imparting movement to the latter, substantially as described.

E. H. DE LANY.

Witnesses:
A. C. DIEFFENBACH,
GEORGE WOOD LOGAN.